United States Patent [19]
Takagi

[11] Patent Number: 5,371,857
[45] Date of Patent: Dec. 6, 1994

[54] INPUT/OUTPUT INTERRUPTION CONTROL SYSTEM FOR A VIRTUAL MACHINE

[75] Inventor: Hitoshi Takagi, Tokyo, Japan

[73] Assignee: NEC Corporation, Tokyo, Japan

[21] Appl. No.: 955,442

[22] Filed: Oct. 2, 1992

[30] Foreign Application Priority Data

Oct. 2, 1991 [JP] Japan .................................. 3-254021

[51] Int. Cl.[5] .............................................. G06F 13/00
[52] U.S. Cl. ............................ 395/275; 364/DIG. 1; 364/230; 364/230.2; 364/231.5; 364/DIG. 2; 364/939.3; 364/939.6; 364/941.0; 364/946.2; 395/725
[58] Field of Search ............... 395/725, 325, 650, 275, 395/800

[56] References Cited

U.S. PATENT DOCUMENTS

| 4,742,447 | 5/1988 | Duvall et al. | 395/375 |
|---|---|---|---|
| 4,812,967 | 3/1989 | Hirosawa et al. | 395/725 |
| 4,860,190 | 8/1989 | Kaneda et al. | 395/275 |
| 4,912,628 | 5/1990 | Briggs | 395/650 |
| 4,969,092 | 11/1990 | Shorter | 395/650 |
| 5,010,481 | 4/1991 | Ishida | 395/425 |
| 5,023,771 | 6/1991 | Kishi | 395/550 |
| 5,062,037 | 10/1991 | Shorter et al. | 395/325 |
| 5,088,031 | 2/1992 | Takasaki et al. | 395/400 |
| 5,101,346 | 3/1992 | Ohtsuki | 395/800 |
| 5,187,802 | 2/1993 | Inoue et al. | 395/325 |

Primary Examiner—Jack B. Harvey
Assistant Examiner—Ayaz R. Sheikh
Attorney, Agent, or Firm—Sughrue, Mion, Zinn, Macpeak & Seas

[57] ABSTRACT

The input/output interruption control system comprises a plurality of instruction processors, a plurality of virtual machines, a control program for activation and control of the virtual machines, an input/output processor which activates input/output operation, and a memory (4) for interruption information storing. The instruction processor further comprises registers (53, 63) to store identifiers to identify the virtual machine currently in operation, an interruption acceptance (52, 62) to accept input/output completion interruption requests for the virtual machine currently in operation, and an interruption check (54, 64) which recognizes the existence of an input/output completion interruption request for the virtual machine in operation and activates the input/output completion interruption processing, and a notification bus (5) to send the input/output completion interruption request and the identifier of the specific virtual machine to other instruction processor when the specific virtual machine is activated. Such interruption acceptance (52, 62) of the instruction processors further comprises a input (90) to forcibly activate the interruption check (54, 64) means upon acceptance of an input/output completion interruption and identifier for the specific virtual machine from other instruction processor.

12 Claims, 9 Drawing Sheets

52(62) INTERRUPTION ACCEPTANCE MEANS
51(61) INTERRUPTION INDICATION FLAG
54(64) INTERRUPTION CHECK MEANS

INPUT/OUTPUT INTERRUPTION CONTROL SYSTEM FOR A VIRTUAL MACHINE

BACKGROUNDS OF THE INVENTION

1. Field of the Invention

This invention relates to an input/output interruption control system for virtual machines operating on a real machine.

2. Description of the Prior Art

A virtual machine system means a computer provided with a plurality of virtual computer systems simultaneously operating thereon. A plurality of virtual machines operate on a real machine using the principle of time sharing mainly. A virtual machine operates for a predetermined period of time. When the time is up, it stores the hardware status required for continued execution at the next occasion in its memory. Then, a program called virtual machine monitor or virtual machine control program starts operation. The virtual machine monitor (VMM) determines which virtual machine is to be activated next and instructs the hardware to activate that virtual machine. The hardware restores the hardware information for the newly activated virtual machine using the data stored on the memory and sets the time for use, and then, activates the new virtual machine. Typical examples of virtual machines as described above are given in "IBM Virtual Machine Facility/370: Introduction (GC-20-1800)".

The virtual machine monitor also serves for operations to be collectively controlled among the virtual machines on the source of the real machine (hardware). A typical example is the input/output operation. When a virtual machine inputs or outputs, the virtual machine monitor actually inputs or outputs on behalf of the virtual machine. The virtual machine monitor replaces a virtual input/output device of the virtual machine with a real device and activates the input/output operation by the real machine. An interruption to notify the completion of the input/output operation is accepted not by the virtual machine, but by the virtual machine monitor. The virtual machine monitor checks the input/output completion interruption to see for which virtual machine it is issued and simulates interruption to the target virtual machine.

In this method, however, simulation of the input/output operation by the virtual machine monitor results in a large overhead. Therefore, recent systems adopt the direct input/output execution method where the virtual machine directly activates input/output and accepts the input/output completion interruption.

In the direct input/output execution method, when a virtual machine running on an instruction processor (real machine) requests the input/output processor to activate input/output operation, it sends its virtual machine ID (VMID) to the input/output processor together with the input/output request so that the system can identify from which virtual machine the input/output request is received. A VMID is an identifier to specify a specific virtual machine among active virtual machines in the system. The input/output processor instructs the input/output device to start input/output operation upon request from a virtual machine, and upon completion of the input/output operation, sends an input/output completion interruption request together with the same VMID as the one received with the input/output operation request to the instruction processor. The instruction processor receiving the request compares the VMID sent from the input/output processor together with the input/output completion interruption with the VMID of the virtual machine which is currently running. If they are identical, then the interruption is accepted.

However, since virtual machines use the instruction processor with time sharing, when an input/output completion interruption for a virtual machine is sent to the instruction processor, it is possible that the virtual machine with the same VMID is not in operation on that instruction processor, which results in ignorance of the interruption. In such a case, a flag called an interruption cell showing that there was an interruption is set on the memory. Prior to sending an input/output completion interruption request to the instruction processor, the input/output processor records interruption occurrence information for that virtual machine at the interruption cell. With this step, the input/output processor can terminate the input/output operation and proceed to another operation. The interruption recorded in the interruption cell is recognized when the applicable virtual machine accepts the next interruption. Upon acceptance of the interruption, the instruction processor clears the interruption information in the interruption cell.

Thus, the ignored input/output interruption must wait until the time when the virtual machine with the same VMID runs on the instruction processor and another interruption is issued. The timing of next running of a specific virtual machine depends on the scheduling method for virtual machines used by the virtual machine monitor and operation status of other virtual machines. In addition, new interruption always comes after an uncertain period. Thus, the time until the interruption once ignored is accepted is always uncertain and input/output completion interruption may be kept waiting for a long time. This impairs the execution performance of a virtual machine serving for direct execution of input/output.

SUMMARY OF THE INVENTION

It is an object of the present invention to provide an input/output interruption control system for virtual machines which prevents the input/output completion interruption for a virtual computer from being kept waiting for the acceptance for a long time and improves the performance of the virtual machines serving for direct input/output execution.

According to a preferred embodiment according to the present invention to attain this object, an input/output interruption control system for virtual machines comprises an instruction processor, a virtual machine which operates on the instruction processor, a control program for activation and control of the virtual machine, an input/output processor which activates input/output operation upon request from the virtual machine and requests the instruction processor to issue an input/output completion interruption for the virtual machine after completion of the input/output operation, and an interruption information storage means to store as interruption information the fact that an input/output completion interruption exists for the virtual machine sent from the input/output processor until the acceptance of the interruption, the instruction processor further comprising a means to store identifiers to identify the virtual machine currently in operation, an interruption acceptance means to accept input/output completion interruption requests for the virtual machine currently in operation, and an interruption check means which is activated by acceptance of an input/output completion interruption request by the interruption acceptance means, reads the contents out of the interruption information storage means so as to learn the existence of any input/output completion interruption request for the virtual machine in operation, and activates the input/output completion interruption processing, and the interruption acceptance means further comprising a means to forcibly activate the interruption check means when a specific virtual machine is activated.

According to another preferred embodiment, the interruption acceptance means comprises a judging means which compares the identifier stored in the means to store identifiers for the virtual machine and the identifier sent together with the input/output completion interruption so as to judge whether the input/output completion interruption request is for the virtual machine currently in operation and another judging means which compares the identifier sent with the input/output completion interruption and the identifier for a specific virtual machine so as to judge whether the input/output completion interruption request is for the specific virtual machine.

According to still another preferred embodiment of the present invention, an input/output interruption control system for virtual machines comprises a plurality of instruction processors, a plurality of virtual machines which operate on the instruction processors, a control program for activation and control of the virtual machines, an input/output processor which activates input/output operation upon request from the virtual machine and requests the instruction processor to issue an input/output completion interruption for the virtual machine after completion of the input/output operation, and an interruption information storage means to store as interruption information the fact that an input/output completion interruption exists for the virtual machine sent from the input/output processor until the acceptance of the interruption, the instruction processor further comprising a means to store identifiers to identify the virtual machine currently in operation, an interruption acceptance means to accept input/output completion interruption requests for the virtual machine currently in operation, and an interruption check means which is activated by acceptance of an input/output completion interruption request by the interruption acceptance means, reads the contents out of the interruption information storage means so as to learn the existence of any input/output completion interruption request for the virtual machine in operation, and activates the input/output completion interruption processing, and a notification means to send the input/output completion interruption request and the identifier of the specific virtual machine to other instruction processor when the specific virtual machine is activated, and the interruption acceptance means of the instruction processors comprising a means to forcibly activate the interruption check means upon acceptance of the input/output completion interruption request and identifier of the specific virtual machine from other instruction processor.

According to further preferred embodiment, the interruption acceptance means comprises a judging means which compares the identifier stored in the means to store identifiers for the virtual machine and the identifier sent with the input/output completion interruption so as to judge whether the input/output completion interruption request is for the virtual machine currently in operation, and another judging means which compares the identifier sent with the input/output completion interruption and the identifier for a specific virtual machine so as to judge whether the input/output completion interruption request is for the specific virtual machine.

According to another preferred embodiment of the present invention to attain the object, an input/output interruption control system for virtual machines comprises a plurality of instruction processors, a plurality of virtual machines which operate on the instruction processors, a control program for activation and control of the virtual machines, an input/output processor which activates input/output operation upon request from the virtual machine and requests the instruction processor to issue an input/output completion interruption for the virtual machine after completion of the input/output operation, and an interruption information storage means to store as interruption information the fact that an input/output completion interruption exists for the virtual machine sent from the input/output processor until the acceptance of the interruption, the instruction processor further comprising a means to store identifiers to identify the virtual machine currently in operation, an interruption acceptance means to accept input/output completion interruption requests for the virtual machine currently in operation, and an interruption check means which is activated by acceptance of an input/output completion interruption request by the interruption acceptance means, reads the contents out of the interruption information storage means to learn the existence of any input/output completion interruption request for the virtual machine in operation, and activates the input/output completion interruption processing, and a notification means to send the input/output completion interruption request and the identifier of the specific virtual machine to other instruction processor when the specific virtual machine is activated, the interruption acceptance means of the instruction processors further comprising a means to forcibly activate the interruption check means upon acceptance of the input/output completion interruption request and the identifier for the specific virtual machine from other instruction processor, the interruption check means still further comprising a means to read out the contents of the interruption information storage means upon acceptance of an input/output completion interruption request during operation of a specific virtual machine, a judging means to judge whether there exists an input/output completion interruption request for other virtual machine in the interruption information read out, and a means to have the notification means make notification when there is any input/output completion interruption request for other virtual machine.

According to still another preferred embodiment, the interruption acceptance means further comprises a judging means which compares the identifier stored in the means to store identifiers for the virtual machine and the identifier sent with the input/output completion interruption so as to judge whether the input/output completion interruption request is for the virtual machine currently in operation, and another judging means which compares the identifier sent with the input/output completion interruption and the identifier for a specific virtual machine so as to judge whether the input/output completion interruption request is for the specific virtual machine.

According to still another embodiment of the present invention to attain the object, an input/output interruption control system for virtual machines comprises a plurality of instruction processors, a plurality of virtual machines which operate on the instruction processors, a control program for activation and control of the virtual machines, an input/output processor which activates input/output operation upon request from the virtual machine and requests the instruction processor to issue an input/output completion interruption for the virtual machine after completion of the input/output operation, and an interruption information storing means to store as information the fact that an input/output completion interruption exists for the virtual machine sent from the input/output processor until the acceptance of the interruption, the instruction processor further comprising a means to store identifiers to identify the virtual machine currently in operation, an interruption acceptance means to accept input/output completion interruption requests for the virtual machine currently in operation, and an interruption check means which is activated by acceptance of an input/output completion interruption request by the interruption acceptance means, reads the contents out of the interruption information storage means so as to recognize the existence of any input/output completion interruption request for the virtual machine in operation, and activates the input/output completion interruption processing, a means which, when the control program to activate a specific virtual machine is activated, reads the contents of the interruption information storage means to check for an input/output completion interruption for the specific virtual machine or for other virtual machine, and a means which, when there exists an input/output completion interruption for other virtual machine, makes interruption on the control program and activates the virtual machine for which an input/output completion interruption exists.

According to another preferred embodiment, the interruption acceptance means further comprises a judging means which compares the identifier stored in the means to store identifiers for the virtual machine and the identifier sent with the input/output completion interruption so as to judge whether the input/output completion interruption request is for the virtual machine currently in operation, and another judging means which compares the identifier sent with the input/output completion interruption and the identifier for a specific virtual machine so as to judge whether the input/output completion interruption request is for the specific virtual machine.

According to another preferred embodiment, the interruption check means further comprises a means to read out the contents of the interruption information storage means upon acceptance of an input/output completion interruption request during operation of a specific virtual machine, a judging means to check the read out interruption information to see whether there exists an input/output completion interruption request for other virtual machine and a means to have the notification means make notification when there is any input/output completion interruption request for other virtual machine.

Other objects, characteristics and effects of the present invention will be clarified in the detailed description below.

DESCRIPTION OF THE PREFERRED EMBODIMENT

Figure 1:
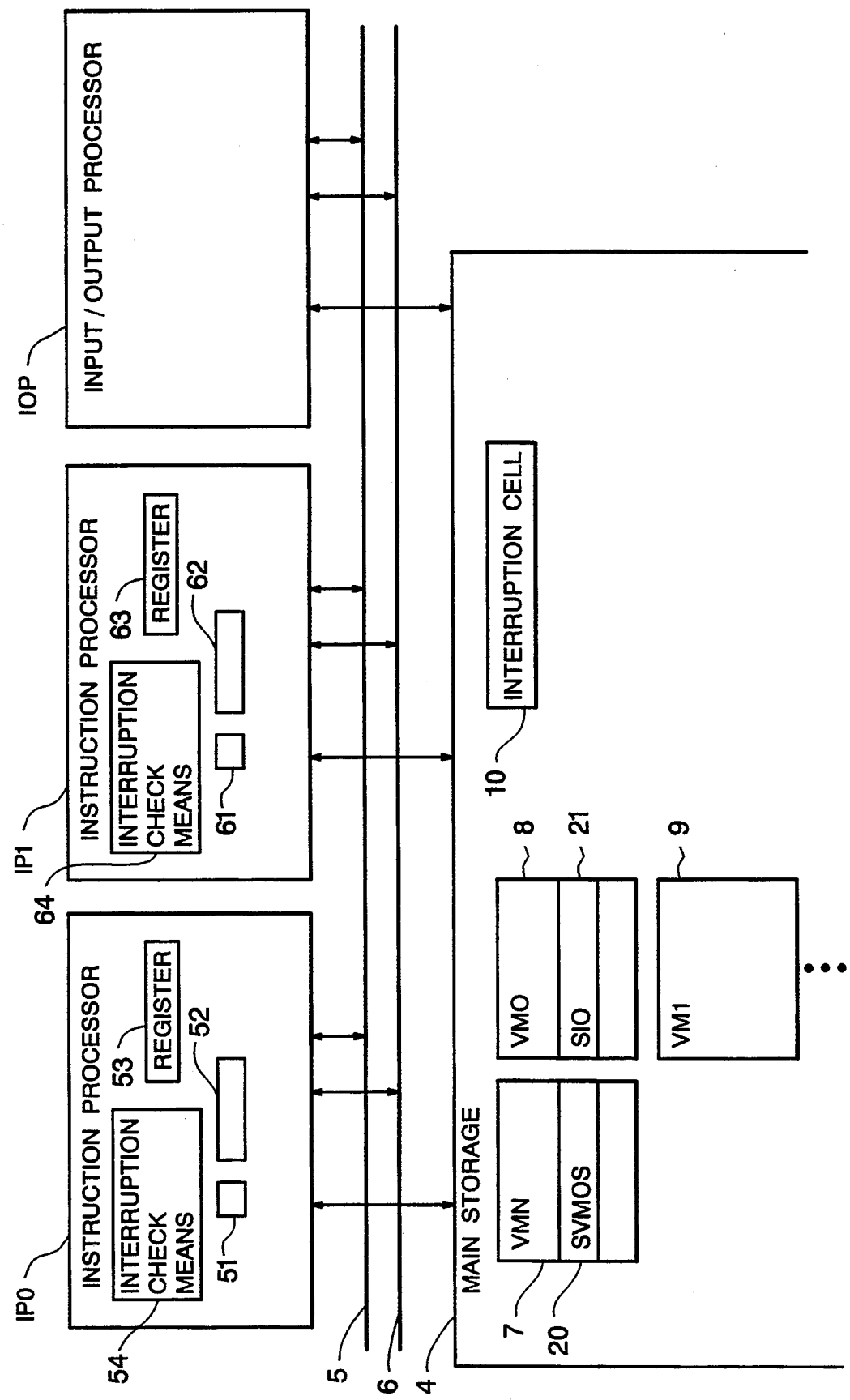
FIG. 1 is a block diagram to show the configuration of an information processing unit which adopts the input/output interruption control system for virtual machines according to the present invention.

Referring to the attached figures, preferred embodiments of an input/output interruption control system for virtual machines according to the present invention will be described below. FIG. 1 shows the configuration of an information processing unit which adopts the input/output interruption control system for virtual computers according to the present invention.

Firstly, referring to FIG. 1, the configuration and general operation of an information processing unit are described.

This information processing unit comprises two instruction processors IP0 and IP1 (real machines) and one input/output (I/O) processor IOP. It is noted here that, though the system comprises two instruction processors, the following description is also applicable to a system with three or more instruction processors. The instruction processors IP0 and IP1 are provided with interruption indication flags 51 and 61, interruption acceptance means 52 and 62, registers 53 and 63, and interruption check means 54 and 64.

The instruction processors IP0 and IP1 as well as the I/O processor IOP are connected with a main storage 4. The processors are mutually connected by two buses 5 and 6. The bus 5 is used for sending and receiving of data by the processors. The data sent and received include I/O operation activation requests from the instruction processors IP0 and IP1 to the I/O processor IOP and I/O completion interruption requests from the I/O processor IOP or the instruction processors IOP and IP1 to the instruction processors IP0 and IP1.

The main storage 4 has a virtual machine monitor (VMM) 7 which operates on either of the instruction processors IP0 and IP1 and control information 8, 9 and so on for a plurality of virtual machines VM0, VM1 and so on (operating systems for operation of virtual machines VM0 and VM1, for example). The virtual machine monitor (VMM) 7 contains an activation instruction SVMOS (Start Virtual Machine Operating System) 20, and the control information 8 and 9 for the virtual machines VM0 and VM1 contain the I/O activation instruction SIO (start I/O) 21. The control information 8 and 9 on the main storage 4 are loaded to the instruction processor where the SVMOS instruction 20 is executed and, according to that information, the virtual machine operates. The main storage 4 is further provided with an interruption cell 10 as described later.

Figure 9:
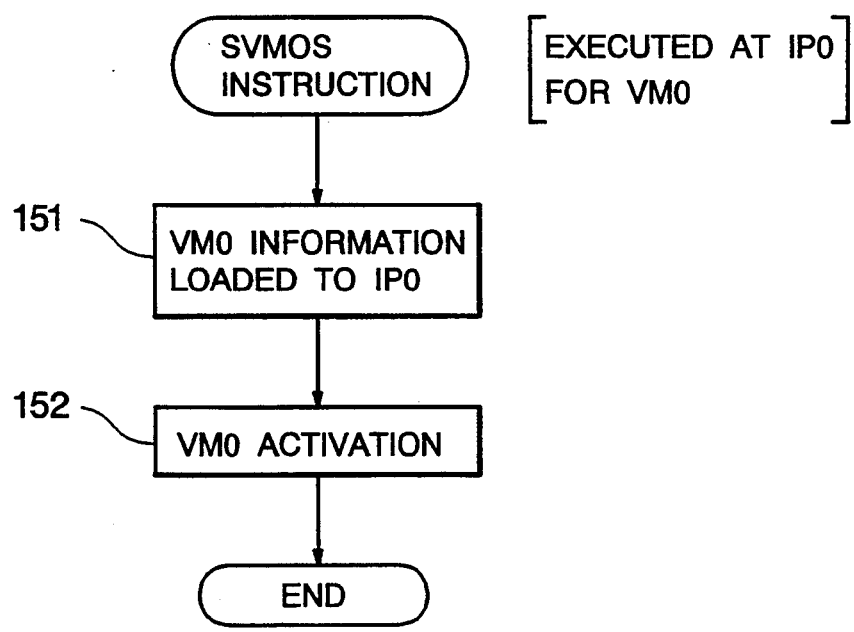
FIG. 9 is a flowchart to show the normal operation of SVMOS instruction.

When loading the control information 8 and 9, VMIDs are set for the registers 53 and 63. FIG. 9 shows the operation after an SVMOS instruction. In FIG. 9, it is assumed that the executed SVMOS instruction specifies that the virtual machine VM0 with VMID=0 is executed on the instruction processor IP0. First of all, the control information 8 for the virtual machine VM0 in the main storage 4 is loaded to the instruction processor IP0 (Step 151). Then, the virtual machine VM0 is activated (Step 152).

When the virtual machine operating on the instruction processor IP0 or IP1 executes the SIO instruction 21, the instruction processor IP0 or IP1 requests the I/O processor IOP to activate the I/O operation via the bus 5. This causes the VMID of the virtual machine which executed the SIO instruction 21 to be sent via the bus 6 to the I/O processor IOP. The I/O processor IOP accepts the I/O operation request and at the same time stores the sent VMID for later sending of an I/O completion interruption to the instruction processor IP0 or IP1. Upon completion of the I/O operation activated by the I/O processor IOP, the I/O processor sends an I/O completion interruption via the bus 5 to the requesting instruction processor IP0 or IP1. Via the bus 6, the VMID for the virtual machine given with the request for I/O operation activation is sent.

Prior to sending an I/O completion interruption, the I/O processor IOP sets an interruption cell 10 on the main storage 4 so that it indicates existence of interruption. The interruption cell 10 is, for example, comprises word data, and the bit positions for the word data are defined so as to correspond to the VMID of the virtual machines. Such word data are given for each of a plurality of I/O devices controlled by the I/O processor IOP. In other words, each time it completes I/O operation, the I/O processor IOP sets a logical value "1" at the bit position of the word data (in the interruption cell 10 corresponding to the I/O device) corresponding to the VMID of the virtual machine which requested the I/O operation so as to indicate the existence of interruption.

The instruction processor IP0 or IP1 which learns the existence of I/O completion interruption sent via the bus 5 obtains the VMID of the virtual machine currently running from the register 53 or 63 and compares it with the VMID sent from the bus 6. If these VMIDs are identical, the interruption indication flag 51 or 61 are set (the logical value "1" is given). Setting of the interruption indication flag 51 or 61 activates the interruption check means 54 or 64 in the instruction processor IP at certain timing. The interruption check means 54 or 64 reads out the interruption cell 10 to learn that an interruption for the virtual machine exists and then clears the applicable bit at the interruption cell 10. This activates the interruption processing routine for the virtual machine.

Figure 10:
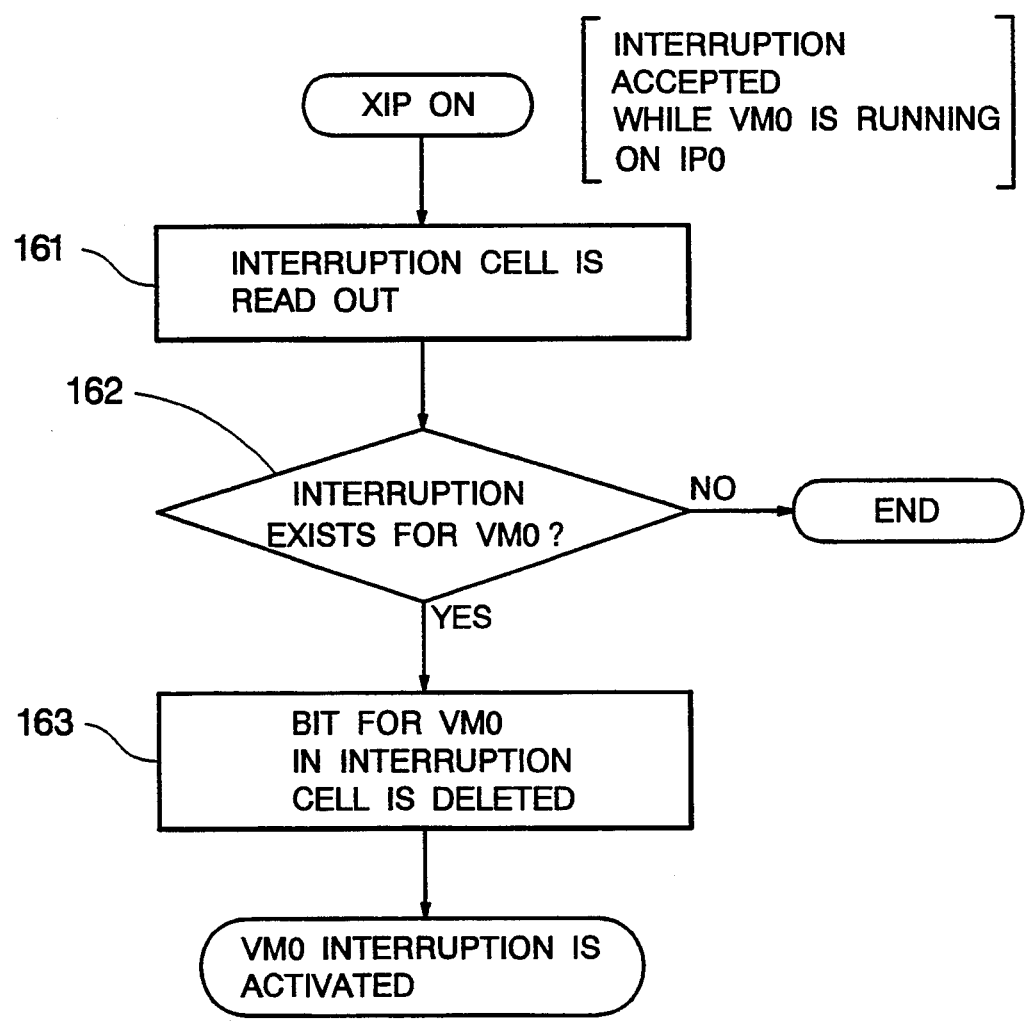
FIG. 10 is a flowchart to show the normal operation of an interruption check means.

FIG. 10 shows the operation of the interruption check means 54 or 64. In FIG. 10, it is assumed that an I/O completion interruption from the I/O processor IOP is accepted while the VM0 is running on the instruction processor IP0. First of all, the interruption check means 54 reads the interruption cell 10 (Step 161). Then, the bit position (bit 0) corresponding to the virtual machine VM0 in the interruption cell 10 is checked to see whether there exists an I/O completion interruption for the virtual machine VM0 (Step 162). If there is no I/O completion interruption, the interruption processing terminates without doing anything. If there exists an interruption, the corresponding bit in the interruption cell 10 which has been just read is reset for resetting of the interruption for the virtual machine VM0 (Step 163). Then, the interruption processing is activated.

If, as described above, the VMID sent via the bus 6 is different from the one for the virtual machine currently running on the instruction processor IP0 or IP1, the interruption is not accepted, but its occurrence is stored in the interruption cell 10. Thus, when another interruption is accepted next, it is recognized that there was an interruption.

Figure 2:
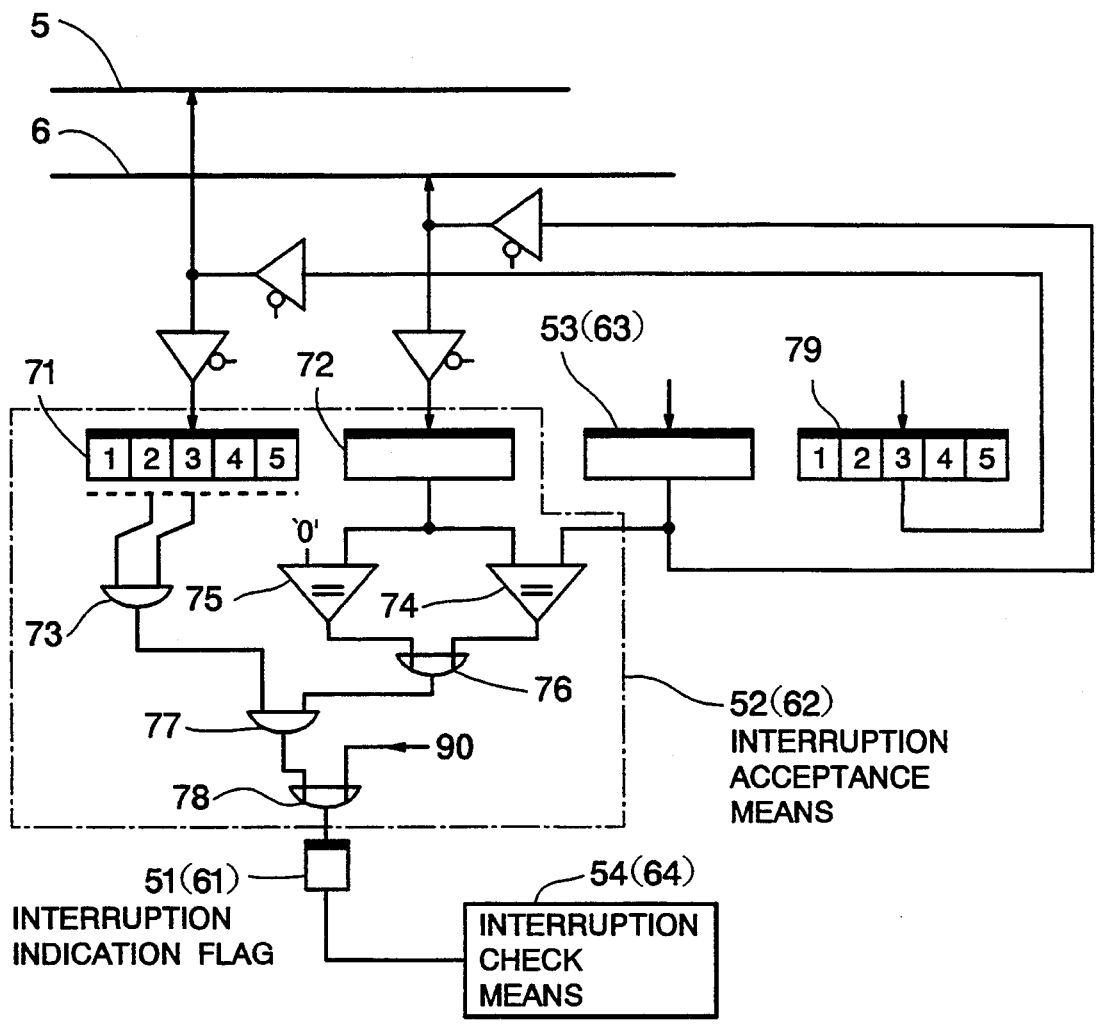
FIG. 2 is a block diagram to illustrate the interruption acceptance in an instruction processor.
Figure 3:
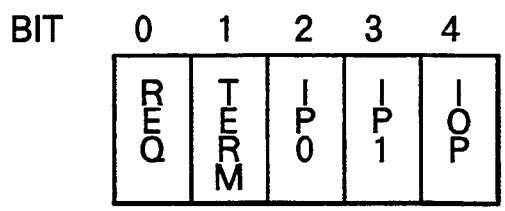
FIG. 3 is a diagram to show the data format on a request bus.

In this embodiment, in order to forcibly set the interruption indication flags 51 and 61 for the instruction processors IP0 and IP1, VMID=0 is used for a special meaning. Specifically, when an I/O completion interruption request is sent via the bus 5 and VMID=0 is sent via the bus 6, the interruption indication flags 51 and 61 for the instruction processors IP0 and IP1 are set to "1". FIG. 2 shows an example of interruption acceptance in the instruction processors IP0 and IP1. FIG. 3 shows the format of data to execute the I/O operation activation request and the I/O completion interruption request sent via the bus 5. The bits have the following meanings.

| bit | Meaning |
| --- | --- |
| 0 (REQ) | I/O operation activation request |
| 1 (TERM) | I/O completion interruption request |
| 2 (IP0) | Destination (to IP0) |
| 3 (IP1) | Destination (to IP1) |
| 4 (IOP) | Destination (to IOP) |

Specifically, with the above data format, setting of the logical value "1" at the bits 1 and 2, for example, means that the data requests the I/O completion interruption at the instruction processor IP0.

In FIG. 2, the interruption acceptance means 52 comprises registers 71 and 72, an AND gate 73, comparators 74 and 75, an OR gate 76, an AND gate 77 and an OR gate 78. Its operation when the I/O processor IOP sends an I/O completion interruption request to the instruction processor IP0 or IP1 is described now. The data sent from the bus 5 is stored in the register 71 with the format as shown in FIG. 3. The VMID sent from the bus 6 is stored in the register 72. By reading the data using the AND gate 73, the means recognizes that the data is an I/O completion interruption for the instruction processor IP0 or IP1. The comparator 74 compares the value at the register 72 and the value at the register 53 (63) storing the VMID of the virtual machine currently running. The comparator 75 compares the register 72 and VMID=0. The outputs from the comparators 74 and 75 are ORed at the OR gate 76. If the outputs from the AND gate 73 and the OR gate 76 are both active, the interruption indication flag 51 (61) is set via the AND gate 77 and the OR gate 78. Setting of the interruption indication flag 51 (61) activates the interruption check means 54 at certain timing. In FIG. 2, an input terminal 90 of the OR gate 78 is made active when the interruption indication flag 51 is forcibly set. The register 79 serves for storing the data indicating any request for an I/O completion interruption sent from a specific instruction processor to another instruction processor (data in FIG. 3). The data in this register 79 is sent to the other instruction processor via the bus 5.

Next, the contents of the input/output interruption processing for an information processing unit configured as above is described.

Firstly, a first control processing of the present invention is described.

Figure 4:
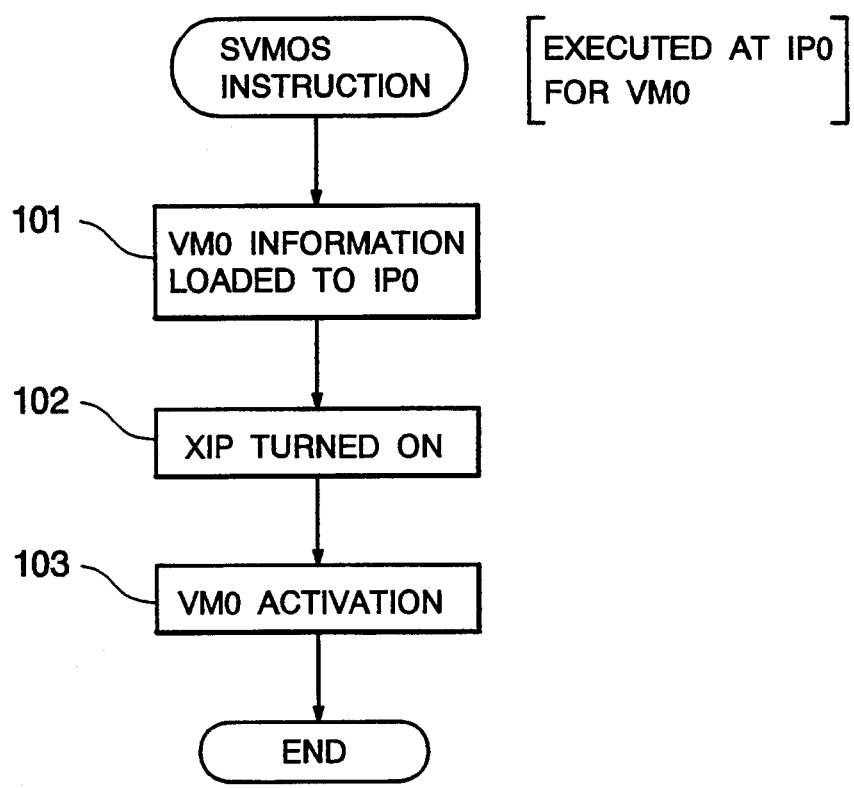
FIG. 4 is a flowchart to show the operation of an SVMOS instruction in a first embodiment.

FIG. 4 is a flowchart to illustrate the operation of an SVMOS instruction 20 for the virtual machine monitor 7 which realizes the first processing method of the present invention. It is assumed here that the SVMOS instruction 20 for activation of the virtual machine VM0 at the instruction processor IP0 is executed. First of all, control information 8 for the virtual machine VM0 in the main storage 4 is loaded to the instruction processor IP0 (Step 101). Then, the interruption indication flag 51 is set to "1" via the OR gate 78 (Step 102). For this setting of "1" at the interruption indication flag 51 via the OR gate 78, as shown in FIG. 2, the other input terminal 90 of the OR gate 78 is made active. Finally, the virtual machine VM0 is activated according to the control information loaded above (Step 103). Setting at the interruption indication flag 51 causes activation of the interruption check means 54, which recognizes the interruption immediately after the activation of the virtual machine VM0. If the interruption request for the virtual machine VM0 is set at the interruption cell 10, the virtual machine VM0 precedes to interruption processing. This processing is as described above. This embodiment is applicable not only to a system with two or more instruction processors as shown in FIG. 1, but also to a system with a single instruction processor.

The processing according to the first embodiment is applicable to and effective in a virtual machine system on a single instruction processor or a system on a multiprocessor where virtual machines do not support the multiprocessor.

Next, a second control processing according to the present invention is now described.

Figure 5:
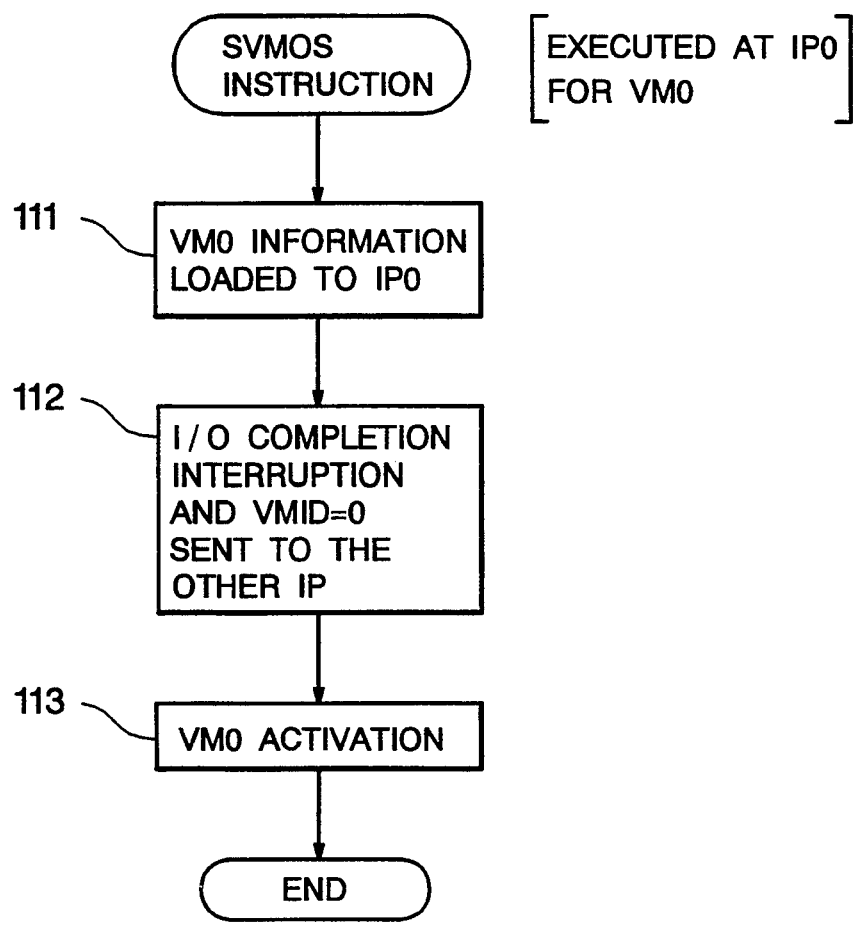
FIG. 5 is a flowchart to show the operation of an SVMOS instruction in a second embodiment.

FIG. 5 is a flowchart to illustrate the operation of an SVMOS instruction 20 for the virtual machine monitor 7 which realizes the second processing method of the present invention. Shown here is the execution of the SVMOS instruction 20 to activate the virtual machine VM0 at the instruction processor IP0. First of all, control information 8 for the virtual machine VM0 in the main storage 4 is loaded to the instruction processor IP0 (Step 111). Then, to set the interruption indication flag 61 of the other instruction processor IP1, an I/O completion interruption request is sent to the other instruction processor IP1 via the bus 5. At the same time, the VMID of the virtual machine VM0 currently running on the instruction processor IP0 is sent to the other instruction processor IP1 via the bus 6 (Step 112). Finally, the virtual machine VM0 is activated on the instruction processor IP0.

This activates the interruption check means 54 or 64 if the same VM is running on the other instruction processor IP, which may results in processing of suspended interruption. This method is effective for simulation of multiprocessor using virtual machines where input/output completion interruption can be processed by only one specific processor, for example.

The processing according to the second embodiment is applicable to and effective in a system where virtual machines on a multiprocessor support the multiprocessor.

A third control processing according to the present invention is now described.

Figure 6:
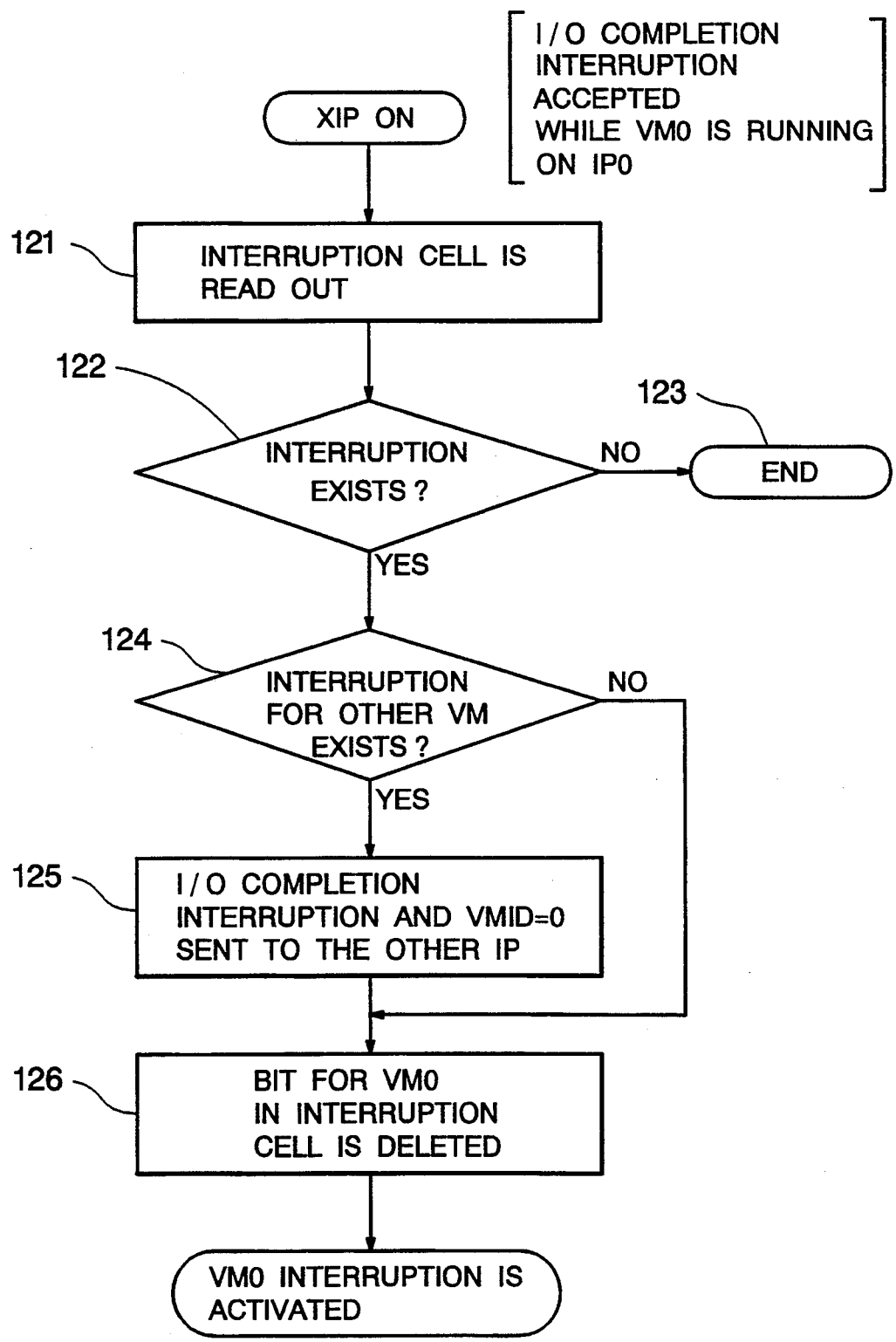
FIG. 6 is a flowchart to show the operation of an interruption check means in a third embodiment.

FIG. 6 is a flowchart to illustrate the operation of the interruption check means 54 (64) which realizes the third processing method according to the present invention. It is assumed here that the interruption check means 54 is activated when the instruction processor IP0 is currently running the virtual machine VM0. First of all, the contents of the interruption cell 10 are read out of the main storage 4 (Step 121). Then, thus read out contents are checked to see whether there exists any interruption (Step 122). If there is no interruption, the processing terminates and the virtual machine VM0 continues to be run (Step 123). If there exists any interruption in the interruption cell 10, then it is further checked whether there exists any interruption for another virtual machine VM (Step 124). If any of the interruption factors is for a virtual machine other than the virtual machine VM0, the I/O completion interruption request via the bus 5 and VMID=0 via the bus 6 are sent to the other instruction processor IP1 (Step 125). Finally, the interruption indication bit for the virtual machine VM0 in the interruption cell 10 is cleared and the execution of the interruption processing routine for the virtual machine VM0 is started (Step 126).

The processing according to the third embodiment is applicable to and effective in a virtual machine system with a high multiplicity (where a large number of machines are simultaneously operable), and with high input/output frequency for the virtual machines.

Now, a fourth control processing according to the present invention is described.

Figure 7:
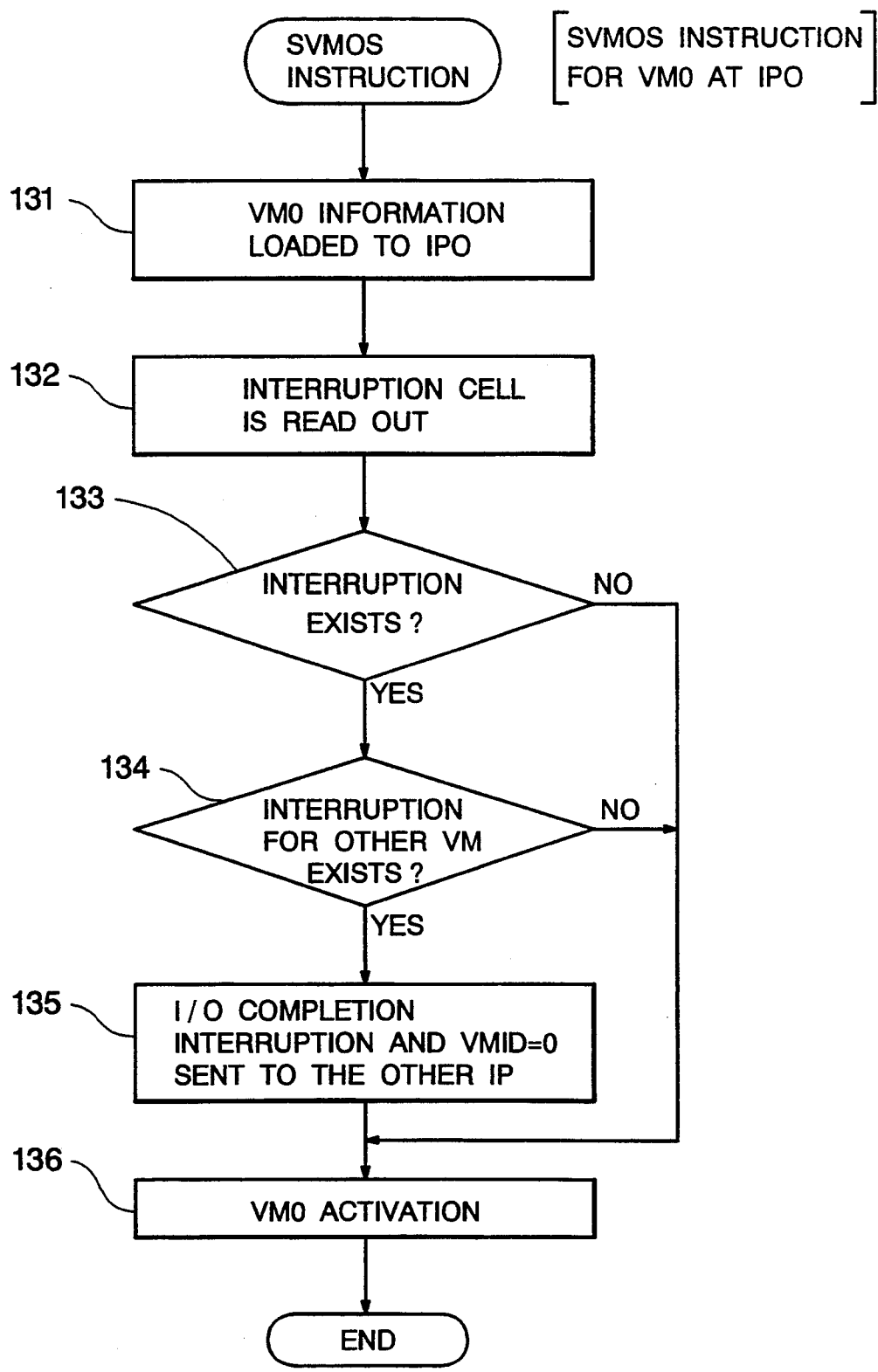
FIG. 7 is a flowchart to show the operation of an SVMOS instruction in a fourth embodiment.

FIG. 7 is a flowchart to illustrate the operation of an SVMOS instruction 20 for the virtual machine monitor 7 which realizes the fourth processing method according to the present invention. It is also assumed here that the SVMOS instruction 20 to activate the virtual machine VM0 at the instruction processor IP0 is executed. Firstly, control information 8 for the virtual machine VM0 in the main storage 4 is loaded to the instruction processor IP0 (Step 131). Then, the contents of the interruption cell 10 on the main storage 4 are read out (Step 132). The contents of the interruption cell 10 thus read out are checked to see whether there exists any interruption (Step 133). If there is no interruption, the virtual machine VM0 is activated and the operation of the SVMOS instruction 20 terminates (Step 136). If there is an interruption, then it is further checked whether there exists any interruption for another virtual machine VM (Step 134). If any of the interruption factors is for a virtual machine other than the virtual machine VM0, then the I/O completion interruption request via the bus 5 and VMID=0 via the bus 6 are sent to the other instruction processor IP1 (Step 135). Finally, the virtual machine VM0 is activated and the operation of the SVMOS instruction 21 terminates (136). The I/O completion interruption for the virtual machine VM0 is processed according to the conventional method as described above.

The processing according to the fourth embodiment is applicable to and effective in a system using multiprocessors for instruction processors and single processors for virtual machines, particularly for a virtual machine system with a high multiplicity.

Now, a fifth control processing according to the present invention is described.

Figure 8:
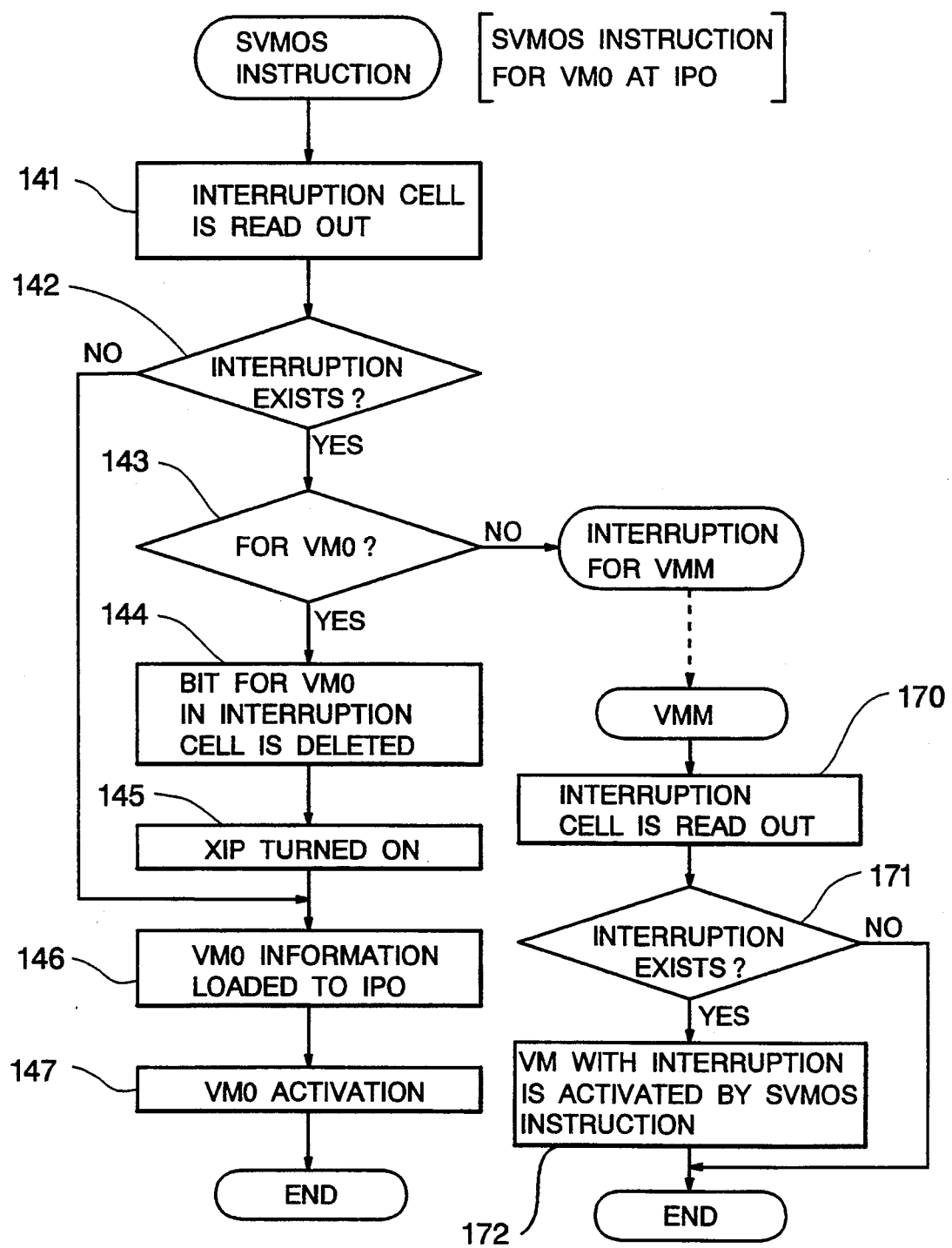
FIG. 8 is a flowchart to show the operation of an SVMOS instruction in a fifth embodiment.

FIG. 8 is a flowchart to illustrate the operation of an SVMOS instruction 20 for the virtual machine monitor 7 which realizes the fifth processing method according to the present invention. It is also assumed here that the SVMOS instruction 20 to activate the virtual machine VM0 on the instruction processor IP0 is executed. Firstly, the contents of the interruption cell 10 on the main storage 4 are read out (Step 141). The contents of the interruption cell 10 thus read out are checked to see whether there exists any interruption (Step 142). If there is no interruption, the control information 8 for the virtual machine VM0 in the main storage 4 is loaded to the instruction processor IP0 (Step 146) so as to activate the virtual machine VM0 (Step 147). This terminates the operation of the SVMOS instruction 20. If the interruption factors do not include any interruption for the virtual machine VM0 but include the ones for a virtual machine other than the virtual machine VM0, then the interruption is made for the virtual machine monitor 7, which terminates the operation of the SVMOS instruction 20 (Step 143). If any of the interruption factors is for the virtual machine VM0, the interruption indication bit for the virtual machine VM0 in the interruption cell 10 is cleared (Step 144), and the interruption indication flag 51 is set (Step 145). Finally, the control information 8 for the virtual machine VM0 in the main storage 4 is loaded to the instruction processor IP0 (Step 146) and the virtual machine VM0 is activated (Step 147), which terminates the operation of the SVMOS instruction 20.

The interrupted virtual machine monitor 7 reads out the contents of the interruption cell 10 (Step 170), checks for any interruption (Step 171), and then executes the SVMOS instruction 20 for the virtual machine VM for which an interruption exists (Step 172).

The processing according to the fifth embodiment is, as in the case of the third embodiment, applicable to and effective in a virtual machine system with high multiplicity (where a large number of machines are simultaneously operable), and with high input/output frequency for the virtual machines, particularly in the cases where real time input/output is desired.

The third processing of the present invention shown in FIG. 6 may be embodied together with the first processing method in FIG. 4, the second method in FIG. 5, the fourth method of FIG. 7 and fifth method of FIG. 8.

Thus, with the input/output completion interruption method as described above, any suspended interruption can be found in the check at every activation of a virtual machine or every acceptance of interruption. This ensures rapid interruption acceptance for a specific virtual machine having suspended interruptions, which results in higher performance of virtual machines where input and output are directly executed.

Obviously, various modifications can be made to the above embodiments. It is intended to cover in the appended claims all such modifications as fall within the true spirit and scope of the invention.

What is claimed is:

1. An input/output interruption control system for virtual machines comprising:
    an instruction processor,
    a virtual machine which operates on said instruction processor,
    a control program for activation and control of said virtual machine,
    an input/output processor which activates input/output operation upon request from said virtual machine and sends an input/output completion interruption request together with a virtual machine identifier to said instruction processor for said virtual machine after completion of the input/output operation, and
    an interruption information storage means for storing interruption information set by said input/output processor to indicate that an input/output completion interruption request exists for said virtual machine until the acceptance of the interruption, which interruption information storage means is accessible both from said instruction processor and said input/output processor,
    said instruction processor further comprising a means for storing said virtual machine identifier to identify the virtual machine currently in operation,
    an interruption acceptance means for accepting said input/output completion interruption request from said interruption information storage for the virtual machine currently in operation, and
    an interruption check means for reading the contents out of said interruption information storage means so as to learn the existence of any input/output completion interruption request for the virtual machine in operation, and activating an input/output completion interruption processing, which interruption check means is activated by acceptance of an input/output completion interruption request by said interruption acceptance means, and
    said interruption acceptance means further comprising a means to forcibly activate said interruption check means when a specific virtual machine is activated.

2. An input/output interruption control system for virtual machines of claim 1 wherein said interruption acceptance means comprises:
    a judging means for comparing the identifier stored in said means to store identifiers for the virtual machine and the virtual machine identifier sent together with said input/output completion interruption so as to judge whether the input/output completion interruption request is for the virtual machine currently in operation, and
    another judging means for comparing the identifier sent with said input/output completion interruption and the identifier for a specific virtual machine so as to judge whether the input/output completion interruption request is for said specific virtual machine.

3. An input/output interruption control system for virtual machines comprising:
    a plurality of instruction processors,
    a plurality of virtual machines which operate on said instruction processors,
    a control program for activation and control of said virtual machines,
    an input/output processor which activates input/output operation upon request from said virtual machines and sends an input/output completion interruption request together with a virtual machine identifier to said instruction processors for said virtual machine after completion of the input/output operation, and
    an interruption information storage means for storing interruption information set by said input/output processor to indicate that an input/output completion interruption request exists for said virtual machine sent from said input/output processor until the acceptance of the interruption, which interruption information storage means is accessible both from said instruction processors and said input-/output processor, said instruction processors further comprising:

a means for storing said virtual machine identifier to identify the virtual machines currently in operation, an interruption acceptance means for accepting said input/output completion interruption request from said interruption information means for the virtual machine currently in operation, and an interruption check means for reading the contents out of said interruption information storage means so as to learn the existence of any input/output completion interruption request for the virtual machine in operation, and activating an input/output completion interruption processing, which interruption check means is activated by acceptance of an input/output completion interruption request by said interruption acceptance means, and a notification means for sending the input/output completion interruption request and the identifier of the specific virtual machine to other instruction processor when the specific virtual machine is activated, and said interruption acceptance means of said instruction processors comprising a means for activating forcibly said interruption check means upon acceptance of said input/output completion interruption request and identifier of said specific virtual machine from other instruction processor.

4. An input/output interruption control system for virtual machines of claim 3 wherein said interruption acceptance means comprises:

a judging means for comparing the identifier stored in said means to store identifiers for the virtual machine and the virtual means identifier sent together with said input/output completion interruption so as to judge whether the input/output completion interruption request is for the virtual machine currently in operation, and another judging means for comparing the identifier sent with said input/output completion interruption and the identifier for a specific virtual machine so as to judge whether the input/output completion interruption request is for said specific virtual machine.

5. An input/output interruption control system for virtual machines comprising:

a plurality of instruction processors, a plurality of virtual machines which operate on said instruction processors, a control program for activation and control of said virtual machines, an input/output processor which activates input/output operation upon request from said virtual machines and sends an input/output completion interruption request together with a virtual machine identifier to said instruction processors for said virtual machine after completion of the input/output operation, and an interruption information storage means for storing interruption information set by said input/output processor to indicate that an input/output completion interruption request exists for said virtual machine sent from said input/output processor until the acceptance of the interruption, which interruption information storage means is accessible both from said instruction processors and said input-/output processor, said instruction processors further comprising:

a means for storing said virtual machine identifier to identify the virtual machines currently in operation, an interruption acceptance means for accepting said input/output completion interruption request from said interruption information storage means for the virtual machine currently in operation, and an interruption check means for reading the contents out of said interruption information storage means so as to learn the existence of any input/output completion interruption request for the virtual machine in operation, and activating an input/output completion interruption processing, which interruption check means is activated by acceptance of an input/output completion interruption request by said interruption acceptance means, and a notification means for sending the input/output completion interruption request and the identifier of the specific virtual machine to other instruction processor when the specific virtual machine is activated, said interruption acceptance means of the instruction processors further comprising:

a means for activating forcibly said interruption check means upon acceptance of said input/output completion interruption request and said identifier for said specific virtual machine from other instruction processor, said interruption check means still further comprising:

a means for reading out the contents of said interruption information storage means upon acceptance of an input/output completion interruption request during operation of a specific virtual machine, a judging means for judging whether there exists an input/output completion interruption request for other virtual machines in the interruption information read out, and a means for having said notification means make notification when there is any input/output completion interruption request for another virtual machine.

6. An input/output interruption control system for virtual machines of claim 5 wherein said interruption acceptance means further comprises:

a judging means for comparing the identifier stored in the means to store identifiers for the virtual machine and the virtual machine identifier sent together with said input/output completion interruption so as to judge whether the input/output completion interruption request is for the virtual machine currently in operation, and another judging means for comparing the identifier sent with said input/output completion interruption and the identifier for a specific virtual machine so as to judge whether the input/output completion interruption request is for said specific virtual machine.

7. An input/output interruption control system for virtual machines comprising:

a plurality of instruction processors, a plurality of virtual machines which operate on said instruction processors, a control program for activation and control of said virtual machines, an input/output processor which activates input/output operation upon request from said virtual machines and sends an input/output completion interruption request together with a virtual machine identifier to said instruction processors for said virtual machine after completion of the input/output operation, and an interruption information storing means for storing interruption information set by said input/output processor to indicate that an input/output completion interruption request exists for said virtual machine sent from said input/output processor until the acceptance of the interruption, which interruption information storage means is accessible both from said instruction processors and said input/output processor, said instruction processors further comprising:

a means for storing said virtual machine identifier to identify the virtual machines currently in operation, an interruption acceptance means for accepting said input/output completion interruption request from said interruption information storage means for the virtual machine currently in operation, and an interruption check means for reading the contents out of said interruption information storage means so as to recognize the existence of any input/output completion interruption request for the virtual machine in operation, and activating an input/output completion interruption processing, which interruption check means is activated by acceptance of an input/output completion interruption request by said interruption acceptance means, a notification means for sending the input/output completion interruption request and the identifier of the specific virtual machine to other instruction processor, a means for reading the contents of said interruption information storage means upon acceptance of an input/output interruption request during operation of a specific virtual machine, a judging means for judging whether there exists an input/output completion interruption request for other virtual machines in the interruption information read out, and a means for having said notification means make notification when there is any input/output completion interruption request for another virtual machine, said interruption acceptance means of said instruction processors comprising:

a means for activating forcibly said interruption check means upon acceptance of said input/output completion interruption request and identifier of said specific virtual machine from other instruction processor.

8. An input/output interruption control system method for virtual machines of claim 7 wherein said interruption acceptance means further comprises:

a judging means for comparing the identifier stored in the means to store identifiers for the virtual machine and the virtual machine identifier sent together with said input/output completion interruption so as to judge whether the input/output completion interruption request is for the virtual machine currently in operation, and another judging means for comparing the identifier sent with said input/output completion interruption and the identifier for a specific virtual machine so as to judge whether the input/output completion interruption request is for said specific virtual machine.

9. An input/output interruption control system for virtual machines of claim 7 wherein said interruption check means further comprises:

a means for reading out the contents of the interruption information storage means upon acceptance of an input/output completion interruption request during operation of a specific virtual machine, a judging means for checking the read out interruption information to see whether there exists an input/output completion interruption request for other virtual machines, and a means for having said notification means make notification when there is any input/output completion interruption request for other virtual machine.

10. An input/output interruption control system for virtual machines comprising:

a plurality of instruction processors, a plurality of virtual machines which operate on said instruction processors, a control program for activation and control of said virtual machines, an input/output processor which activates input/output operation upon request from said virtual machines and sends an input/output completion interruption request together with a virtual machine identifier to said instruction processors for said virtual machine after completion of the input/output operation, and an interruption information storage means for storing interruption information set by said input/output processor to indicate that an input/output completion interruption request exists for said virtual machine sent from said input/output processor until the acceptance of the interruption, which interruption information storage means is accessible both from said instruction processors and said input/output processor, said instruction processors further comprising:

a means for storing said virtual machine identifier to identify the virtual machines currently in operation, an interruption acceptance means for accepting said input/output completion interruption request from said interruption information storage means for the virtual machine currently in operation, an interruption check means for reading the contents out of said interruption information storage means so as to learn the existence of any input/output completion interruption request for the virtual machine in operation, and activating an input/output completion interruption processing, which interruption check means is activated by acceptance of an input/output completion interruption request by said interruption acceptance means, a means for reading out the contents of the interruption information storage means to check for any input/output completion interruption for the specific virtual machine or other virtual machine when said control program for activation of the specific virtual machine is activated, and a means for making interruption to said control program so as to activate the virtual machine when an input/output completion interruption exists, upon learning the existence of an input/output completion interruption for another machine.

11. An input/output interruption control system for virtual machines of claim 10 wherein said interruption acceptance means further comprises:

a judging means for comparing the identifier stored in the means to store identifiers for the virtual machine and the identifier sent with said input/output completion interruption so as to judge whether the input/output completion interruption request is for the virtual machine currently in operation, and another judging means for comparing the identifier sent with said input/output completion interruption and the identifier of the specific virtual machine to judge whether the input/output completion interruption request is for said specific virtual machine.

12. An input/output interruption processing method for virtual machines of claim 10 wherein said interruption check means further comprises:

a means for reading out the contents of the interruption information storage means upon acceptance of an input/output completion interruption request during operation of the specific virtual machine, a judging means for checking the read out interruption information to see whether there exists an input/output completion interruption request for other virtual machines, and a means for having said notification means make notification when there is an input/output completion interruption request for other virtual machine.

* * * * *